US009700792B2

(12) United States Patent
Takamura et al.

(10) Patent No.: US 9,700,792 B2
(45) Date of Patent: *Jul. 11, 2017

(54) GAME DEVICE

(71) Applicant: Sony Interactive Entertainment Inc., Tokyo (JP)

(72) Inventors: Seiichi Takamura, Tokyo (JP); Kazuki Ohara, Tokyo (JP); Hideaki Watanabe, Tokyo (JP)

(73) Assignees: Sony Corporation, Tokyo (JP); Sony Interactive Entertainment Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/181,739

(22) Filed: Jun. 14, 2016

(65) Prior Publication Data

US 2016/0287993 A1  Oct. 6, 2016

Related U.S. Application Data

(63) Continuation of application No. 13/583,078, filed as application No. PCT/JP2010/073578 on Dec. 27, 2010, now Pat. No. 9,393,489.

(51) Int. Cl.
A63F 9/24 (2006.01)
A63F 13/00 (2014.01)
(Continued)

(52) U.S. Cl.
CPC ............ *A63F 13/533* (2014.09); *A63F 13/12* (2013.01); *A63F 2300/308* (2013.01);
(Continued)

(58) Field of Classification Search
CPC .................................................... G06F 21/78
(Continued)

(56) References Cited

U.S. PATENT DOCUMENTS 6,749,514 B1   6/2004  Moriwaki
2009/0011838 A1*  1/2009  Miyamoto ............. A63F 13/10
                                                 463/43
2016/0184712 A1*  6/2016  Colenbrander ......... A63F 13/79
                                                 463/29

FOREIGN PATENT DOCUMENTS

CN        1287501 A    3/2001
EP        1045725 A1   10/2000
(Continued)

OTHER PUBLICATIONS

International Search Report for corresponding PCT Application No. PCT/JP2010/073578, 2 pages, dated Feb. 22, 2011.
(Continued)

Primary Examiner — Adetokunbo O Torimiro
(74) Attorney, Agent, or Firm — Matthew B. Dernier, Esq.

(57) ABSTRACT

Methods and apparatus provide for a game server carrying out actions, including: generating a selection screen that presents a plurality of reproduction data items, each for reproducing a state of a respective point in time during execution of a game and allowing a user of a game device to select one of the reproduction data items, each reproduction data item representing a respective state of the game achieved by the user while engaged in game play on the game device, the selection screen presenting a first reproduction data item, which is one of the plurality of reproduction data items, in association with a second reproduction data item, wherein the selection screen provides an indication to the user of whether the second reproduction data item reproduces a state of a point in time at which the game has progressed with reference to the state reproduced by the first reproduction data item; and transmitting the generated selection screen to the game device over a network (Continued)

work such that the game device may display the received selection screen on a display device.

20 Claims, 5 Drawing Sheets

(51) Int. Cl.
  *G06F 17/00* (2006.01)
  *G06F 19/00* (2011.01)
  *A63F 13/533* (2014.01)
  *A63F 13/30* (2014.01)
(52) U.S. Cl.
  CPC ... *A63F 2300/407* (2013.01); *A63F 2300/577* (2013.01); *A63F 2300/632* (2013.01)
(58) Field of Classification Search
  USPC ................ 463/20, 22, 25, 30, 31, 35, 43, 44
  See application file for complete search history.

(56) References Cited

FOREIGN PATENT DOCUMENTS

| JP | 2000126452 A | 5/2000 |
|---|---|---|
| JP | 2001149657 A | 6/2001 |
| JP | 2002078956 A | 3/2002 |
| JP | 2009011569 A | 1/2009 |
| JP | 2009247457 A | 10/2009 |
| WO | 0025878 A1 | 5/2000 |

OTHER PUBLICATIONS

"Imabikiso", Dengeki Playstation vol. 401, Media Works Inc., vol. 13, No. 39, pp. 76-79 (Nov. 2007) (see International Search report for relevancy).
International Preliminary Report on Patentability for corresponding PCT Application No. PCT/JP2010/073578, 9 pages, dated Nov. 22, 2012.
Office Action for corresponding CN Patent Application 201080067221.0, 8 pages, dated Mar. 31, 2014.
Office Action for corresponding U.S. Appl. No. 13/583,078, 7 pages, dated Mar. 4, 2014.
Office Action for corresponding U.S. Appl. No. 13/583,078, 5 pages, dated Aug. 5, 2014.
Office Action for corresponding U.S. Appl. No. 13/583,078, 5 pages, dated Aug. 4, 2015.
Office Action for corresponding U.S. Appl. No. 13/583,078, 6 pages, dated Jan. 13, 2016.

* cited by examiner

FIG.3

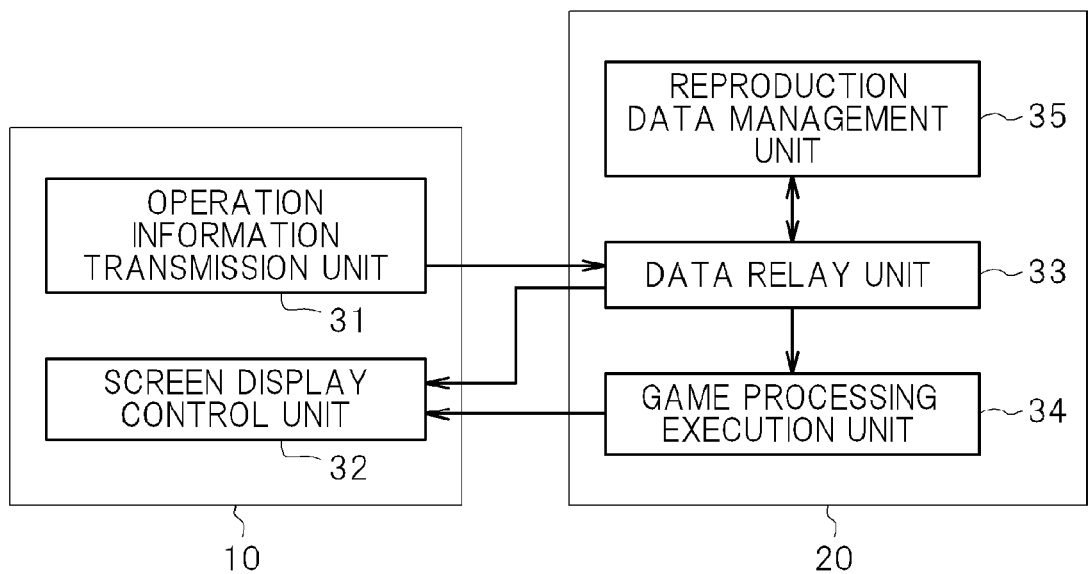

FIG.4

| | |
|---|---|
| REPRODUCTION DATA IDENTIFICATION INFORMATION | ~ SID |
| GAME IDENTIFICATION INFORMATION | ~ GID |
| PARENT REPRODUCTION DATA IDENTIFICATION INFORMATION | ~ PSID |
| CREATION DATE AND TIME | ~ CT |
| USER IDENTIFICATION INFORMATION | ~ UID |
| IMAGE FILE PATH INFORMATION | ~ IF |
| MOVING IMAGE FILE PATH INFORMATION | ~ MF |
| REPRODUCTION DATA FILE PATH INFORMATION | ~ SF |
| PLAY COUNT INFORMATION | ~ PT |
| GENERATION NUMBER | ~ GN |
| PLAY TIME INFORMATION | ~ PM |
| TAG INFORMATION | ~ TG |

MI

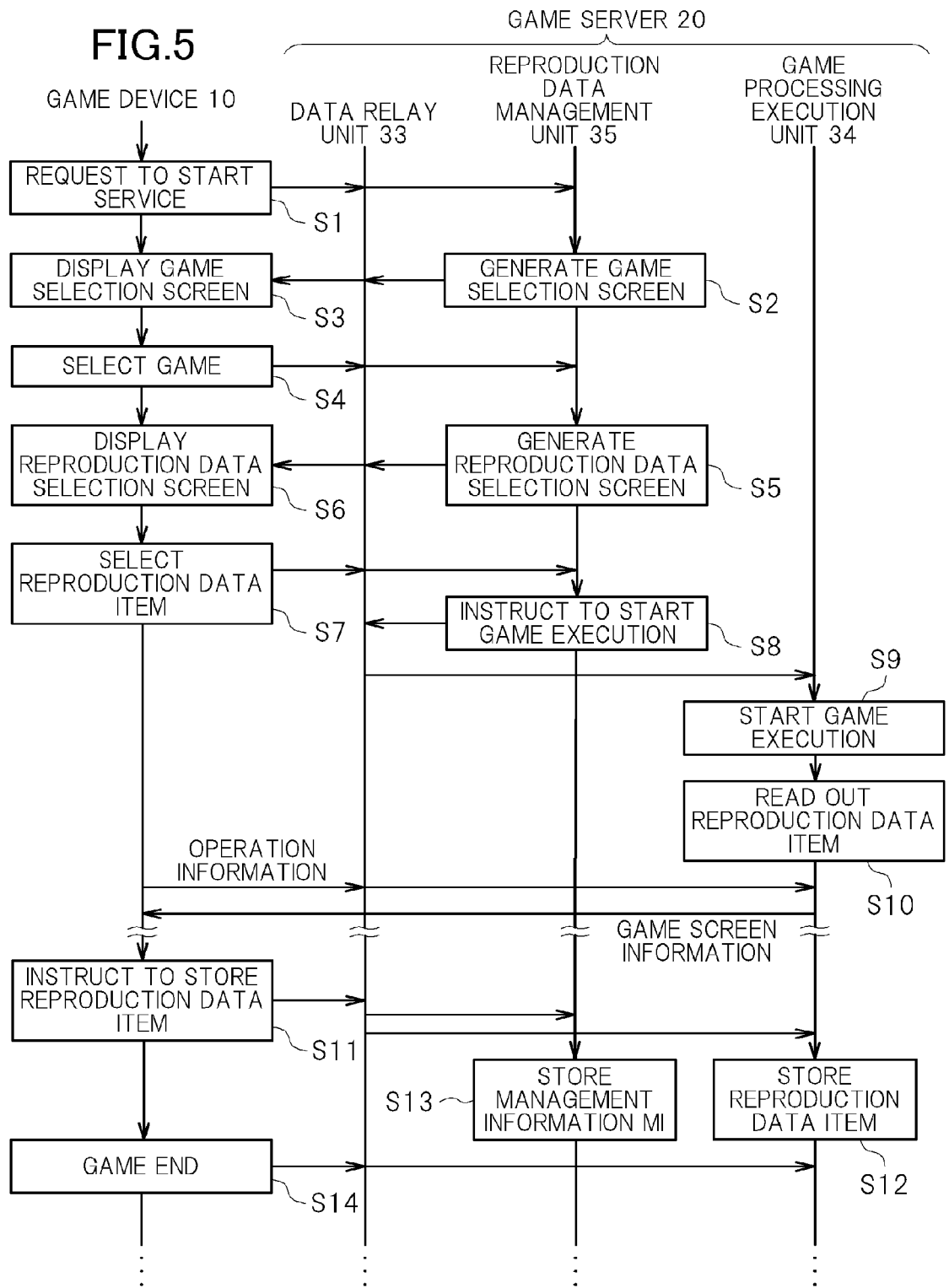

GAME DEVICE

CROSS REFERENCE TO RELATED APPLICATIONS

This application is a continuation application of U.S. patent application Ser. No. 13/583,078, accorded a filing date of Sep. 6, 2012, which is a national phase application of International Application No. PCT/JP2010/073578, filed Dec. 27, 2010, which is an international application claiming priority to JP Patent Application No. JP2010-087224, filed Apr. 5, 2010, the entire disclosures of which are hereby incorporated by reference.

TECHNICAL FIELD

The present invention relates to a game device, a method for controlling the same, a game system, and an information storage medium for displaying images relating to games on a display device.

BACKGROUND ART

In computer games, it is practiced that reproduction data (e.g., saved data) for reproducing a state at a point in time during execution of a game is stored in an information storage medium, such as a memory card or a hard disk drive, and, using the stored reproduction data, previous state is reproduced to restart the game from that state. When a plurality of items of reproduction data are stored, a game system displays a selection screen for allowing a user to select an item to be a target of processing from the plurality of items of reproduction data, and, using the reproduction data item selected by the user on the selection screen, restarts the game. For example, Patent Document 1 describes the technology of displaying, when the game is restarted using the reproduction data item selected by the user, summary information indicative of the progress of a game story at the time the game is restarted.

CITATION LIST

Patent Document: Patent Document 1: EP1045725A1

SUMMARY OF INVENTION

Technical Problem

If a large number of reproduction data items are stored in the game system, a user may become confused as to which reproduction data item may be selected by simply taking a look at these reproduction data items. In particular, in a case where a reproduction data item is stored at a certain point of time, and after the game has further progressed, another reproduction data item is stored, it is difficult to grasp a relationship between these reproduction data items. As a result, it becomes difficult to select a reproduction data item.

The present invention has been conceived in view of the above, and an object thereof is to provide a game device, a method for controlling the same, a game system, and an information storage medium for, when presenting a plurality of reproduction data items to a user, displaying a selection screen that allows the user to easily recognize a relationship among the reproduction data items.

Solution to Problem

A game device according to the present invention includes a selection screen obtaining section that obtains a selection screen that presents a plurality of reproduction data items for reproducing a state of a point in time during execution of a game and allows a user to select one of the reproduction data items, the selection screen presenting a first reproduction data item, which is one of the plurality of reproduction data items, in association with a second reproduction data item, which reproduces a state of a point in time at which the game has progressed from the state reproduced by the first reproduction data item and a display control section that displays the obtained selection screen on a display device.

The selection screen of the game device may be a screen that presents each of the plurality of reproduction data items in association with information on a user who has stored the reproduction data item.

The selection screen may represent a relationship between the first reproduction data item and the second reproduction data item in a tree structure.

A game system according to the present invention includes a game device and a game server that executes game processing. The game server generates a selection screen that presents a plurality of reproduction data items for reproducing a state of a point in time during execution of a game and allowing a user to select one of the reproduction data items, the selection screen presenting a first reproduction data item, which is one of the plurality of reproduction data items, in association with a second reproduction data item, which reproduces a state of a point in time at which the game has progressed from the state reproduced by the first reproduction data item, and transmits the generated selection screen to the game device. The game device receives the transmitted selection screen, and displays the received selection screen on a display device.

In the game system, the game server may include a section that stores information that identifies, in a case where the game server receives operation information indicative of an instruction to select one of the plurality of reproduction data items from the game device while the selection screen is displayed on the display device, the selected reproduction data item. The game server may include a section that executes, in a case where the game server receives operation information indicative of an instruction to select one of the plurality of reproduction data items from the game device, game processing from a state reproduced by the selected reproduction data item. The game server may include a section that stores, in a case where the game server receives operation information indicative of an instruction to store a reproduction data item from the game device during the execution of the game, a reproduction data item for reproducing a state of a point of time when the instruction is received. The game server may include a section that stores management information that associates the first reproduction data item with the second reproduction data item, the second reproduction data item being the reproduction data item stored in response to the instruction to store, and the first reproduction data item being the selected reproduction data item identified by the stored information. The game server may include a section that generates, using the management information, a selection screen that associates the first reproduction data item with the second reproduction data item.

A method for controlling a game device according to the present invention includes steps of obtaining a selection screen that presents a plurality of reproduction data items for reproducing a state of a point in time during execution of a game and allowing a user to select one of the reproduction data items, the selection screen presenting a first reproduction data item, which is one of the plurality of reproduction data items, in association with a second reproduction data item, which reproduces a state of a point in time at which the game has progressed from the state reproduced by the first reproduction data item, and displaying the obtained selection screen on a display device.

An information storage medium according to the present invention is a computer-readable information storage medium that stores a program for causing a computer to function as a selection screen obtaining section that obtains a selection screen that presents a plurality of reproduction data items for reproducing a state of a point in time during execution of a game and allowing a user to select one of the reproduction data items, the selection screen presenting a first reproduction data item, which is one of the plurality of reproduction data items, in association with a second reproduction data item, which reproduces a state of a point in time at which the game has progressed from the state reproduced by the first reproduction data item, and a display control section that displays the obtained selection screen on a display device.

BRIEF DESCRIPTION OF DRAWINGS

FIG. 3 A functional block diagram illustrating functions of the game system according to an embodiment of the present invention.

FIG. 4 A diagram illustrating an exemplary data structure of management information of reproduction data items.

FIG. 5 A diagram illustrating an exemplary flow chart of processing executed in the game system according to an embodiment of the present invention.

DESCRIPTION OF EMBODIMENTS

In the following, an embodiment of the present invention will be described below in detail with reference to the accompanying drawings.

Figure 1:
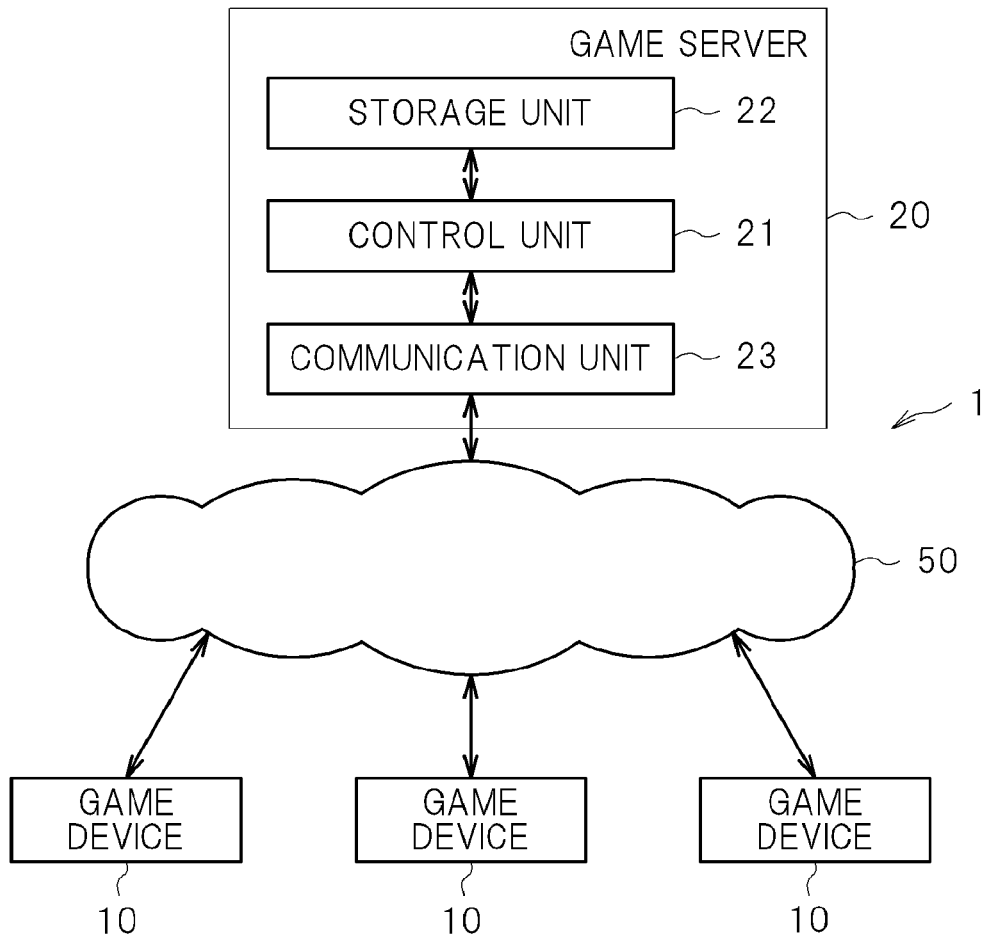
FIG. 1 An overall schematic diagram illustrating a game system according to an embodiment of the present invention.

FIG. 1 is an overall schematic diagram of a game system 1 according to an embodiment of the present invention. The game system 1 allows a plurality of users to play games, and is configured to include a plurality of game devices (client devices) 10 and a game server 20 for executing game programs.

Figure 2:
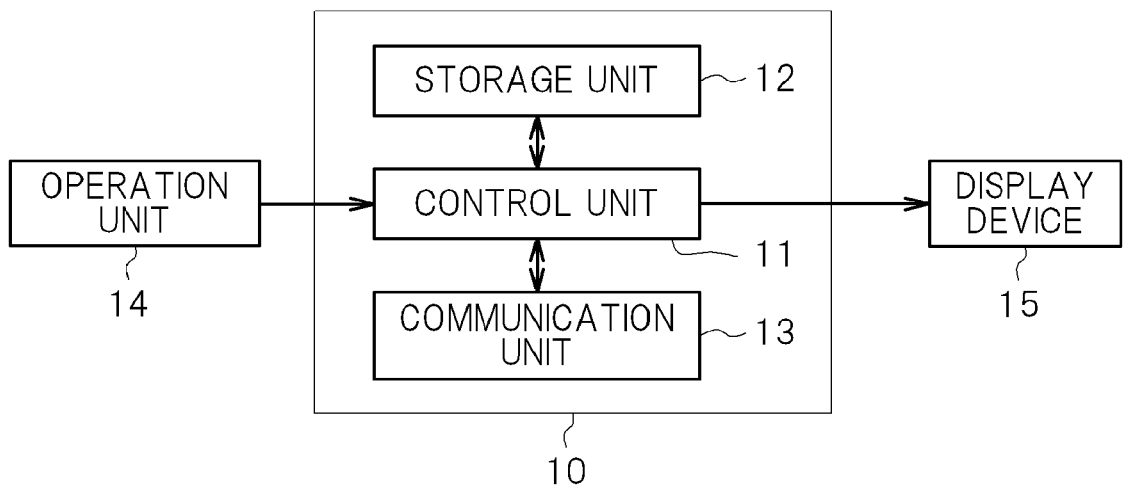
FIG. 2 A diagram illustrating a structure of the game device according to an embodiment of the present invention.

The game device 10 is an information processing device to be used by each of the users of the game system 1, and may be, for example, a home-use game machine, a portable game machine, or a personal computer. FIG. 2 is a diagram illustrating a structure of the game device 10. As shown in FIG. 2, the game device 10 is configured to include a control unit 11, a storage unit 12, and a communication unit 13. The game device 10 is connected to an operation unit 14 and a display device 15.

The control unit 11 is a program control device, such as a CPU, and executes various kinds of information processing in accordance with a program stored in the storage unit 12. The storage unit 12 is configured to include a memory device, such as a RAM or a ROM, and stores the program executed by the control unit 11 and data to be processed in the processing according to this program. The storage unit 12 also operates as a working memory for the control unit 11.

The communication unit 13 is an interface for transmitting and receiving data to and from other devices via a communication network 50. The game device 10 transmits and receives information to and from the game server 20 via the communication unit 13. The game device 10 may be connected to the game server 20 via various kinds of communication network, such as the Internet, a local area network, or a wireless communication network.

The operation unit 14 is a device for receiving an operation input from a user, and may be, for example, a controller of a home-use game machine, a keyboard, a mouse, or a touch panel. The operation unit 14 may include operation members, such as an operation button or a switch, placed on surfaces of the casing of the game device 10. The operation unit 14 may also include various kinds of sensors for detecting e.g., operations of the user. The user operates the operation unit 14 to play a game executed by the game server 20.

The display device 15 is, for example, a liquid crystal display, and displays images outputted by the game device 10. Specifically, in this embodiment, the display device 15 displays a screen on which a game is executed and a selection screen for selecting a reproduction data item described later, based on the control of the game device 10. Similarly to the operation unit 14, the display device 15 may be formed integrally with the casing of the game device 10.

The game server 20 is a server computer for executing a game application. The game server 20 executes game processing based on operation input information transmitted from the game device 10, generates a moving image indicative of a result of the processing, and distributes the moving image to the game device 10. In this embodiment, it is assumed that the game server 20 executes processing of a plurality of kinds of games. As shown in FIG. 1, the game server 20 is configured to include the control unit 21, the storage unit 22, and the communication unit 23.

The control unit 21 is a program control device, such as a CPU, and executes various kinds of information processing in accordance with a program stored in the storage unit 22. The storage unit 22 is configured to include a memory device, such as a RAM or a ROM, and a disk device, such as a hard disk. The storage unit 22 stores a program executed by the control unit 21, and data to be processed in the processing according to this program. Specifically, in this embodiment, the storage unit 22 stores a game program, and the game processing is performed by the control unit 21 executing this game program. The storage unit 22 stores reproduction data items for reproducing a state at a point in time during the game execution. The storage unit 22 also operates as a working memory for the control unit 21.

The communication unit 23 is an interface for transmitting and receiving data to and from other devices via the communication network 50. The game server 20 transmits and receives information to and from each of the game devices 10 via the communication unit 23.

In the following, functions implemented by the game system 1 according to this embodiment will be described. In this embodiment, as mentioned above, the game program is executed by the game server 20. Each of the game devices 10 transmits operation information indicative of the user's operation on the operation unit 14 to the game server 20.

Each game device 10 receives, from the game server 20, moving image data of the game screen indicative of the result of the game processing which the game server 20 executes upon receiving the operation information, and displays the moving image on the display device 15. In this way, the user can play the game executed by the game server 20 via the game device 10.

Further, in this embodiment, the game server 20 stores a plurality of reproduction data items to be used for reproducing a state at a point in time during the execution of the game. By selecting one of the plurality of reproduction data items, the user can start the game from the state that is reproduced by the selected reproduction data item. In particular, in this embodiment, a user can utilize the reproduction data item, which is generated by another user having played a game, to play the game from the state when the reproduction data item was stored. More specifically, suppose that a user U1 plays a game up to a certain point, and stores a reproduction data item (here, first reproduction data item SD1) for reproducing a state of the game at that point. Subsequently, upon selecting the first reproduction data item SD1 from a plurality of reproduction data items stored in the game server 20, another user U2 can play the game from the state reproduced by the first reproduction data item SD1. Further, it is possible to newly store, in the game server 20, a reproduction data item (here, second reproduction data item SD2) for reproducing a state at a point in time during the game play. In this case, the second reproduction data item SD2 indicates the state in which the user U1 plays the game up to a certain point, and the user U2 plays the game after that point.

In this way, reproduction data items are shared among a plurality of users, and thus it is possible for a user to, for example, play a specific scene by selecting the reproduction data item that is stored in a state a little before an attractive scene during the game, without continuously playing the game from the beginning. In a case where the progress of the game changes depending on which option is selected during the game, a user can experience the progress of the game in which the option that has not been selected by the user is selected, by selecting the reproduction data item for reproducing the state in which the option that has not been selected by the user is selected. Further, in a case where the game has a scene that is difficult to clear, a reproduction data item is stored before the game reaches the scene so that another user plays the game using the reproduction data item and completes the difficult scene, thereby allowing the user to play the game subsequent to the scene even if the user themselves cannot clear the specific scene. Moreover, in a game where a user can create or edit content (e.g., character or stage), the user can easily enjoy playing the game using content of another user by selecting the reproduction data item in which another user has created, edited and stored content. In particular, since a plurality of users can respectively play the game from the state when the reproduction data item was stored, it is possible to provide a way of playing the game in which the plurality of users compete, starting under the same conditions, as to how they can successfully play the game. More specifically, for example, using a reproduction data item provided by a certain user, each of a plurality of users play the game, and stores a play result as a new reproduction data item. By comparing the reproduction data items indicating these play results, it is possible to hold a contest to determine which play of the users is the best as a play in the specific situation.

FIG. 3 is a functional block diagram illustrating functions implemented in the game system 1. As shown in FIG. 3, the game device 10 is configured to include an operation information transmission unit 31 and a screen display control unit 32. These functions are implemented by the control unit 11 executing a program stored in the storage unit 12. The game server 2 is configured to include a data relay unit 33, a game processing execution unit 34, and a reproduction data management unit 35. These functions are implemented by the control unit 21 executing a program stored in the storage unit 22. The programs to respectively implement the functions of the game device 10 and the game server 20 may be stored in various kinds of computer-readable information storage medium, such as an optical disc, to be provided to the game device 10 and the game server 20. Alternatively, the programs may be provided to each of the game device 10 and the game server 20 via a communication network such as the Internet.

The operation information transmission unit 31 of the game device 10 transmits, to the game server 20, information (operation information) indicative of an operation of a user of the game device 10 on the operation unit 14.

The screen display control unit 32 of the game device 10 receives screen information (moving image data indicating content of a screen to be displayed on the display device 15), which is transmitted from the game server 20 to the game device 10. By sequentially outputting frame images constituting the received screen information to the display device 15, the screen display control unit 32 displays the received screen information on the display device 15. Specifically, the screen display control unit 32 obtains, from the game server 20, screen information on, for example, a game screen generated by a game processing execution unit 34 described later, and a game selection screen and a reproduction data selection screen generated by the reproduction data management unit 35, and displays the obtained content of the screen on the display device 15.

The data relay unit 33 of the game server 20 functions as an interface to the game device 10, which is a client. Specifically, the data relay unit 33 receives operation information transmitted from the operation information transmission unit 31 of the game device 10, and outputs the received information to one of the game processing execution unit 34 or the reproduction data management unit 35. In other words, while the game processing execution unit 34 executes the game processing, the data relay unit 33 outputs the received operation information to the game processing execution unit 34, and while the selection screen generated by the reproduction data management unit 35 is displayed on the display device 15, the data relay unit 33 outputs the received operation information to the reproduction data management unit 35. Further, the data relay unit 33 transmits image data indicative of various screens generated by the reproduction data management unit 35 to the game device 10. The data relay unit 33 also performs data relaying between the game processing execution unit 34 and the reproduction data management unit 35.

The game processing execution unit 34 of the game server 20 performs the game processing by executing the game program stored in the storage unit 22. Specifically, the game processing execution unit 34 receives user's operation information, which is received by the data relay unit 33, as an operation input of the game, and executes the game processing according to the operation information to progress the game. Then, the game processing execution unit 34 generates data of the game screen indicative of the status of the game reflecting the result of the game processing, and sends the data to the game device 10.

Upon receiving operation information indicative of the user's instruction to store a reproduction data item, the game processing execution unit 34 executes processing for storing the reproduction data item. Here, suppose that the user instructs to store the reproduction data item by performing a specific operation on the operation unit 14. This operation is preferably an operation that is not executed during a usual game operation. For example, the operation is preferably an operation to simultaneously press a plurality of buttons included in the operation unit 14, or an operation to keep pressing one or more buttons for a certain period of time.

The reproduction data item is, as mentioned above, used for reproducing a state at a point in time while the game is being executed, and includes various kinds of information indicative of execution state of the game at that point in time. By reading out the reproduction data item, the game processing execution unit 34 can reproduce the state at the time the reproduction data item was stored, and restart the game processing from the state. The reproduction data item may be the saved data including information indicative of a parameter of a game character or a progress of the game. However, such saved data differs in data format for each kind of game executed by the game server 20, and may thus be complicated to manage.

In view of the above, in this embodiment, suppose that the reproduction data item is a snapshot data item including a memory image indicative of data stored in the memory at the time when the reproduction data item is stored. While the game processing is executed by the game processing execution unit 34, temporary data generated by the running game program is developed in a memory space reserved in the storage unit 22, and the game processing execution unit 34 refers to the temporary data. The memory image is data indicative of content of the memory space. For example, when the game processing execution unit 34 is implemented by an emulator program for emulating processing of other game machines, the memory space which the program accesses has a constant size. Thus, the memory image has the fixed size and the same data format irrespective of kinds of games. If the game processing execution unit 34 obtains the memory image at a point in time during the execution of the game and stores the memory image as the reproduction data item, the game processing execution unit 34 can restart the game processing from the state at the time when the memory image was obtained, by developing the reproduction data item in the memory space again. In this respect, the reproduction data item may include not only the memory image, but also data stored in a register of the control unit 21 at the time when the reproduction data item is stored, and so on.

When storing the reproduction data item, the game processing execution unit 34 may additionally store still image data of the game screen at the time when the reproduction data item is stored. Further, the game processing execution unit 34 may buffer moving images, which indicate game screens transmitted to the game device 10, over the past predetermined time period, and when receiving the instruction to store the reproduction data item, store the latest buffered moving image data of the game screen together with the reproduction data item.

The reproduction data management unit 35 of the game server 20 provides a user interface for allowing a user to select, when the user starts to play a game executed by the game processing execution unit 34, a game to be played and a reproduction data item to be used for reproducing the state at the time of starting the game play. Specifically, the reproduction data management unit 35 generates and outputs, to the data relay unit 33, selection screens for allowing the user to select a game and a reproduction data item. The data relay unit 33 transmits the moving image data indicative of content of these selection screens to the game device 10, thereby enabling the screen display control unit 32 of the game device 10 to display the selection screen generated by the reproduction data management unit 35 on the display device 15. Further, in a state where these selection screens are displayed on the display device 15, when the user instructs the operation unit 14 to select a game or a reproduction data item, the reproduction data management unit 35 receives operation information indicative of the instruction via the data relay unit 33, and performs selection processing of the game or the reproduction data item.

The reproduction data management unit 35 generates, for each of the reproduction data items stored in the game processing execution unit 34, management information MI of the reproduction data item, and stores the management information MI in the storage unit 22. When the reproduction data management unit 35 generates the selection screen of the reproduction data items as mentioned above, the selection screen is generated in a way to show the user a relationship among a plurality of reproduction data items in a comprehensible manner by referring to the management information MI.

FIG. 4 exemplarily illustrates information included in management information MI of the reproduction data item. In the example shown in FIG. 4, the management information MI of the reproduction data item includes reproduction data identification information SID, game identification information GID, parent reproduction data identification information PSID, creation date and time CT, user identification information UID, image file path information IF, moving image file path information MF, reproduction data file path information SF, play count information PT, generation number GN, playing time information PM, and tag information TG.

The reproduction data identification information SID is information for identifying a reproduction data item to be managed by the management information MI. The game identification information GID is information for identifying a game to be reproduced by the reproduction data item. That is, the game identification information GID indicates which game is being executed when the reproduction data item is stored.

The parent reproduction data identification information PSID is information for identifying a reproduction data item that is a parent of the reproduction data item to be managed. Here, a parent-child relationship among the reproduction data items is defined as follows: when a game starts from a state reproduced by the first reproduction data item SD1, and then the second reproduction data item SD2 is stored during the execution of the game, the second reproduction data item SD2 is defined as a child of the first reproduction data item SD1, and the first reproduction data item SD1 is a parent of the second reproduction data item SD2. In a case where game processing is executed, without using a reproduction data item, from an initial state of a game (state when a game first starts) and then a reproduction data item is stored, the stored reproduction data item has no parent reproduction data item. A method for obtaining the parent reproduction data identification information PSID will be explained later.

The creation date and time CT indicates date and time when storing processing of the reproduction data item is executed. The user identification information UID is information for identifying a user who has instructed to store the reproduction data item (i.e., a user who has played the game up to the state to be reproduced by the reproduction data item). For example, when the game device 10 is connected to the game server 20 to start a game play, the game server 20 can obtain the user identification information UID by identifying the user who uses the game device 10.

The image file path information IF, moving image file path information MF, and reproduction data file path information SF are information for respectively specifying storage locations, in the storage unit 22, of a still image file, a moving image file, and a reproduction data file, respectively stored by the game processing execution unit 34 by the storing processing of the reproduction data items. By referring to the file path information, the reproduction data management unit 35 can read out, from the storage unit 22, a reproduction data item to be managed by the management information MI, and still image data and moving image data stored with the reproduction data item. In this regard, the still image data is a still image presenting a game screen at the time when the reproduction data item is stored. Further, the moving image data is a moving image presenting game screens over the past predetermined time period from the time when the reproduction data item was stored.

The play count information PT is information indicating how many times the reproduction data item has been selected as a playing target. It can be assumed that a higher number of play counts is associated with a higher popularity of the reproduction data item that has been selected by a lot of users. The generation number GN is a value indicating how many generations of reproduction data items have passed from the beginning of the game to the point when the reproduction data item is stored. Specifically, a generation number GN of a reproduction data item having no parent reproduction data item is 1, and a generation number GN of a reproduction data item having a parent reproduction data item is a generation number GN of the parent reproduction data item plus 1.

The playing time information PM is information indicative of a playing time of a game at the time when a reproduction data item is stored. In a case where a game starts in a state indicated by a parent reproduction data item, the playing time information PM may be information that indicates amount of time required from the start of the game to the point in time when a child reproduction data item is stored. Alternatively, the playing time information PM may be information indicative of the time obtained by adding the playing time at which the child reproduction data item is stored to the playing time information PM of the parent reproduction data item (i.e., total playing time starting from the initial state of the game).

The tag information TG is information provided by a user who stores the reproduction data item or a user who plays the game using the reproduction data item, so as to sort and identify the reproduction data items. The tag information TG may be a character string (e.g., comment) which can be optionally set by the user who provides the tag information TG.

By referring to a flow chart of FIG. 5, the following explains an example of a flow of processing when a user uses the game system 1 according to this embodiment to play a game. In particular, this flow chart illustrates a flow of the processing in a case where the user selects a game and a reproduction data item to start playing the game, and, while playing the game, newly stores a reproduction data item for reproducing the state of the game in the middle of the play.

In response to an operation of the user, the game device 10 requests the game server 20 to start a service (S1). At this time, the user may input their user name or password for user authentication by the game server 20.

Figure 6:
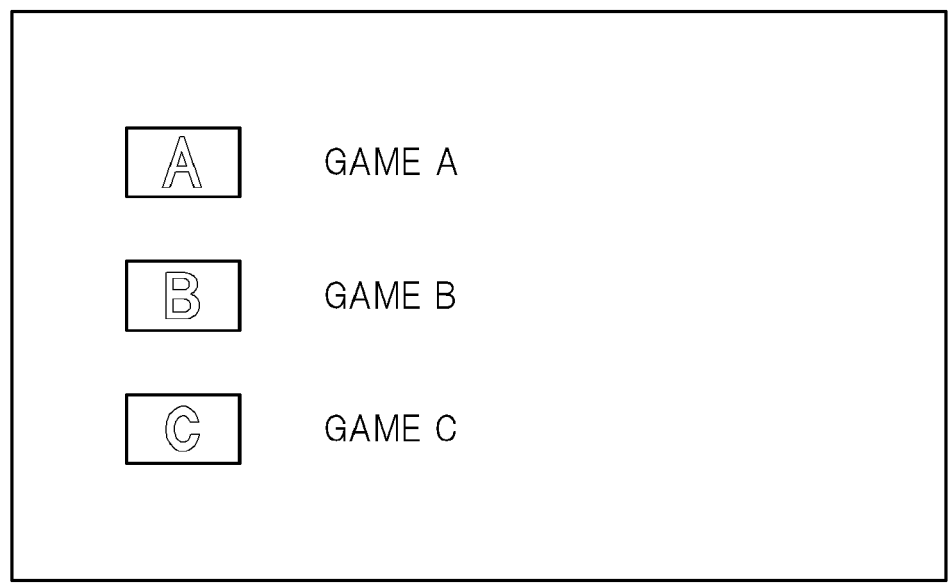
FIG. 6 A diagram illustrating an example of a game selection screen.

In response to the request in S1, the reproduction data management unit 35 of the game server 20 generates a game selection screen, and transmits the generated game selection screen to the game device 10 via the data relay unit 33 (S2). Here, the game selection screen is a selection screen for allowing the user to select one of a plurality of games that are executable by the game processing execution unit 34. The game selection screen transmitted in S2 is displayed on the display device 15 by the screen display control unit 32 of the game device 10 (S3). FIG. 6 illustrates an example of a game selection screen. In this condition, the user performs operation input to the operation unit 14, and selects a game that they desire to play from the plurality of games displayed on the game selection screen (S4). The operation information transmission unit 31 transmits operation information indicative of this operation to the game server 20.

The data relay unit 33 inputs the operation information in S4 to the reproduction data management unit 35. The reproduction data management unit 35 specifies the game selected by the user based on the operation information. Subsequently, the reproduction data management unit 35 extracts management information MI including game identification information GID of the specified game from among respective management information MI of reproduction data items stored in the storage unit 22. Using the extracted management information MI, a reproduction data item that is stored during the execution of the game selected in S4 (i.e., a reproduction data item for reproducing the state while the selected game is executed) is to be specified. Further, using the extracted management information MI, the reproduction data management unit 35 generates a reproduction data selection screen, and transmits the generated reproduction data selection screen to the game device 10 via the data relay unit 33 (S5). Here, the reproduction data selection screen is a selection screen for presenting to the user the reproduction data item of the game selected by the user to allow the user to select the reproduction data item. The screen display control unit 32 of the game device 10 receives the reproduction data selection screen transmitted in S5, and displays the received reproduction data selection screen on the display device 15 (S6).

Figure 7:
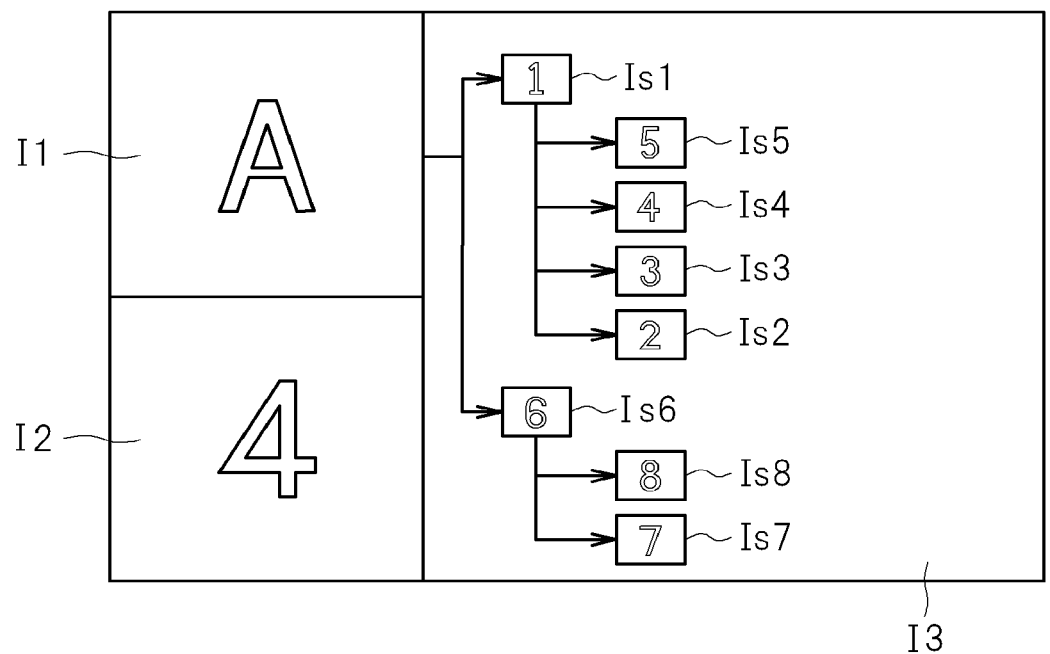
FIG. 7 A diagram illustrating an example of a reproduction data selection screen.

In the following, a specific example of the reproduction data selection screen will be described. FIG. 7 exemplarily illustrates the reproduction data selection screen. In the example shown in FIG. 7, an image I1 indicating a title of the game selected by the user in S4 is displayed on the upper left of the reproduction data selection screen, and an image I2 indicating the currently focused reproduction data item is displayed on the lower left of the reproduction data selection screen. Here, the image I2 may be a still image that is specified by image file path information IF included in management information MI of the focused reproduction data item (i.e., an image of the game screen presenting the state in which the reproduction data item is stored). Alternatively, a moving image specified by the moving image file path information MF may be displayed. In this way, the user can easily recognize by what play and in what state the reproduction data item was stored.

Further, on the right of the reproduction data selection screen, an image I3 indicating a list of a plurality of reproduction data items for reproducing execution state of the game selected by the user is displayed. In particular, in this embodiment, the plurality of reproduction data items are graphically presented to the user in the image I3 for a better understanding of the parent-child relationship. That is, a parent reproduction data item and a child reproduction data item are associated each other in the reproduction data selection screen. For example, in FIG. 7, the parent-child relationship between the reproduction data items is represented in a tree structure. Specifically, in the reproduction data selection screen, each of the reproduction data items is represented in a reduced-size image indicative of the game screen at the time when the reproduction data item is stored. The reproduction data items shown in the reduced-size images connected to each other with arrows are in the parent-child relationship, and the reproduction data items indicated by the arrows are child reproduction data items. By following the arrows, the user can understand the outline of the plays that have been performed from the initial state to the points in time when the reproduction data items were stored. FIG. 7 shows that the reduced-size images Is1 and Is6 are the reproduction data items that have a generation number GN=1 and are generated during the game started from an initial state. The reduced-size images Is2 to Is5 respectively represent the reproduction data items having the parent reproduction data item shown by the reduced-size image Is1 and having a generation number GN=2. The reduced-size images Is7 and Is8 respectively represent the reproduction data items having the parent reproduction data item shown by the reduced-size image Is6 and having a generation number GN=2. Such a hierarchical relationship of the reproduction data items can be generated by referring to parent reproduction data identification information PSID included in management information MI of each reproduction data item.

Although not illustrated in FIG. 7, in addition to the still image or the moving image, information items associated with each reproduction data item may also be displayed on the reproduction data selection screen. The information items may include information of a user (e.g., user name) who has stored the reproduction data item, and creation date and time CT, play count information PT, generation number GN, playing time information PM, and tag information TG of the reproduction data item. Here, information of the user may be the user identification information UID itself, or the user name or an icon of the user obtained based on the user identification information UID and by referring to user database. These information items may be constantly displayed on the reproduction data selection screen for each reproduction data item. Alternatively, only information items related to the currently focused reproduction data item may be displayed. In addition, the reproduction data management unit 35 may change a display format of images representing respective reproduction data items in accordance with the information items. Specifically, for example, the reproduction data management unit 35 may highlight an image representing the reproduction data item having play count information PT that indicates play counts more than a predetermined number by changing a color of the image or by blinking the image.

The user performs operation input to the operation unit 14 in the state where the reproduction data selection screen is displayed, and selects, from the plurality of reproduction data items displayed on the reproduction data selection screen, the reproduction data item for reproducing the state which they desire to play (S7). Specifically, the user performs operation input that indicates a direction to move the focus on the reproduction data items, and operates a button to determine the reproduction data item in a condition where the focus moves on the desired reproduction data item. The operation information indicative of this operation is transmitted to the game server 20 from the operation information transmission unit 31.

Upon receiving the operation information, the reproduction data management unit 35 specifies the reproduction data item selected by the user, and outputs, together with the reproduction data file path information SF of the specified reproduction data item, an instruction to start execution of the game selected in S4 (S8). At this time, the reproduction data management unit 35 temporarily stores the reproduction data identification information SID of the reproduction data item selected by the user in the storage unit 22. This information is referred to as parent reproduction data identification information PSID when a new reproduction data item is stored later.

The instruction outputted in S8 to start the game is inputted into the game processing execution unit 34 via the data relay unit 33. In response to the instruction, the game processing execution unit 34 starts processing of the game selected in S4 (S9). Further, the game processing execution unit 34 reads out the reproduction data item, which is identified by the reproduction data identification information SID outputted from the reproduction data management unit 35 in S8 (i.e., the reproduction data item selected by the user in S7), from the storage unit 22, and reproduces the state of execution of the game according to the read out content (S10). In this way, the user can play the selected game from the state reproduced by the selected reproduction data item. Subsequently, the operation input of the user to the operation unit 14 is inputted into the game processing execution unit 34. In response to the operation input, the game processing execution unit 34 executes processing of the game. The game processing execution unit 34 then generates a game screen showing the state of the game, and transmits the generated game screen to the game device 10.

In this state, when the user instructs the operation unit 14 to store a reproduction data item (S11), operation information indicative of such an operation is transmitted to the game server 20. The data relay unit 33 usually transfers the operation information received during the execution of the game processing only to the game processing execution unit 34. However, if the input operation information indicates that an instruction to store the reproduction data item has been made, the data relay unit 33 transfers the input operation information not only to the game processing execution unit 34 but also to the reproduction data management unit 35.

Upon receiving the operation information, the game processing execution unit 34 generates a reproduction data item for reproducing the state at that point in time and stores the generated reproduction data item in the storage unit 22 (S12). On the other hand, the reproduction data management unit 35 reads out the reproduction data identification information SID, which is temporarily stored at the time when the processing of S8 is executed, of the reproduction data item used at the time of starting the game processing. The reproduction data management unit 35 then generates management information MI including this information as parent reproduction data identification information PSID, and stores, in the storage unit 22, the generated management information MI as management information MI of the reproduction data item stored in S12 (S13). In this case, the reproduction data file path information SF of the reproduction data item stored in S12 is determined according to the predetermined rule. The game processing execution unit 34 stores the reproduction data item based on the file path determined according to the same rule, thereby accessing the reproduction data item later by referring to the management information MI.

Subsequently, the user performs an operation to end the game (S14). At this time, for example, the reproduction data management unit 35 may again generate and transmit, to the game device 10, the game selection screen or the reproduction data selection screen. As a result of the foregoing processing, a new reproduction data item having the parent reproduction data item selected by the user in S7 is stored in the storage unit 22. In a case where any user selects the same game to be played the next time, a reproduction data selection screen including the newly stored reproduction data item is generated in the processing of S5.

In the above processing flow, the user performs an instruction to store the reproduction data item and then separately performs an operation to end the game. However, not limited to this, for example, upon receiving an instruction operation to end the game, the game processing execution unit 34 may execute storing processing of the reproduction data item and end the game processing. In this case, the reproduction data management unit 35 generates management information MI of the reproduction data item in response to the instruction to end the game.

In the above, it is to be noted that information items included in management information MI are examples, and other information items may also be included in management information MI. For example, in this embodiment, operation information indicative of user's operation input is not directly input to the game processing execution unit 34, but input to the game processing execution unit 34 via the data relay unit 33. In this regard, the data relay unit 33 may not only output the operation information to the game processing execution unit 34, but buffer the operation information in the storage unit 22. In this case, if an instruction to store the reproduction data item is received, the reproduction data management unit 35 includes the buffered operation information in the management information MI of the reproduction data item. Using the operation information and the parent reproduction data item of the reproduction data item, it is possible to reproduce the user's play after the game has started from the state indicated by the parent reproduction data item. As such, it is possible to generate a moving image indicative of the play again later without, for example, additionally storing moving image data.

By comparing the operation information items thus stored, it is also possible to determine similarity of reproduction data items. For example, in a case where the reproduction data items have the same parent reproduction data item and their operation information items are also determined to be similar to each other according to the predetermined conditions, relatively similar plays may have been performed, and as a result, the reproduction data items are likely to reproduce relatively similar states. In particular, regarding games with relatively simple operations, such as an adventure game where a game progresses by selecting options, puzzle game, and board game, similarities of the plays can be determined by comparing the operation information items. In view of this, the reproduction data management unit 35 may display the reproduction data items, which are determined to reproduce the similar states, in positions close to each other on the reproduction data selection screen, or may display one representative image to group these reproduction data items, for example. In a case where the representative image is displayed on the reproduction data selection screen and the user selects the representative image, for example, a plurality of reproduction data items represented by the image may be additionally displayed. In the above example, similarities of the reproduction data items are determined using the operation information, but similarities of reproduction data items may also be determined by comparing content of the reproduction data items.

After the game has started from the state that is reproduced by a reproduction data item, the reproduction data management unit 35 may generate, depending on the processing executed by the game processing execution unit 34, management information MI of the reproduction data item such that the reproduction data item to be stored later is not associated with the original reproduction data item, but is regarded as an independent reproduction data item (i.e., data item having a generation number GN=1). For example, while playing the game, there is a case where the user pauses playing the game and goes back to the initial state to restart the game. In this case, a reproduction data item to be stored afterward will reproduce a state that has no direct relationship with a state to be reproduced by the reproduction data item used at the time of starting the game. If it is determined that such a case has occurred, the reproduction data management unit 35 will not associate the reproduction data item with the original reproduction data item. Specifically, for example, the reproduction data management unit 35 restricts the association of the reproduction data items in a case where it is detected that, for example, a predetermined system call is issued to initiate data, or a value of a program counter used by the game processing execution unit 34 is updated to a predetermined initial value. In this case, determining conditions may be common to the games regardless of kinds of games, or defined for each kind of game.

According to the game system 1 of this embodiment as mentioned above, a screen that presents to the user the parent reproduction data item in association with the child reproduction data item is generated as the reproduction data selection screen for allowing the user to select the plurality of reproduction data items. The user can therefore easily understand a relationship among the reproduction data items, and find the desired reproduction data item from among a large number of reproduction data items.

In a case where the relationship among the reproduction data items is represented in a tree structure, it is possible to visually understand the structure, for example, a length (depth of hierarchy) and an expansion (average number of child reproduction data items associated with each reproduction data item) of the tree structure. Accordingly, it is also possible to know a trend of how games are played. For example, if the game has a coherent story and is played for long hours, it is expected that a relationship among reproduction data items will be represented in a relatively long tree structure on the reproduction data selection screen. On the other hand, if the game story changes and develops from a scene to various situations depending on the user's choices, it is expected that a relationship among reproduction data items is represented in a relatively radial and expanding way. As such, the user can find their favorite kind of game by visually identifying a form of the tree structure.

The present invention is not to be limited to the above described embodiment. For example, the selection screens shown in FIGS. 6 and 7 are the examples, and the reproduction data management unit 35 may generate a selection screen in a form different from these examples. For example, in the above, a parent-child relationship among the reproduction data items is represented in the tree structure, but an association between a parent reproduction data item and a child reproduction data item may be displayed such that the reproduction data items are displayed in a list and information for identifying a parent reproduction data item of each reproduction data item is displayed alongside the list.

Figure 8:
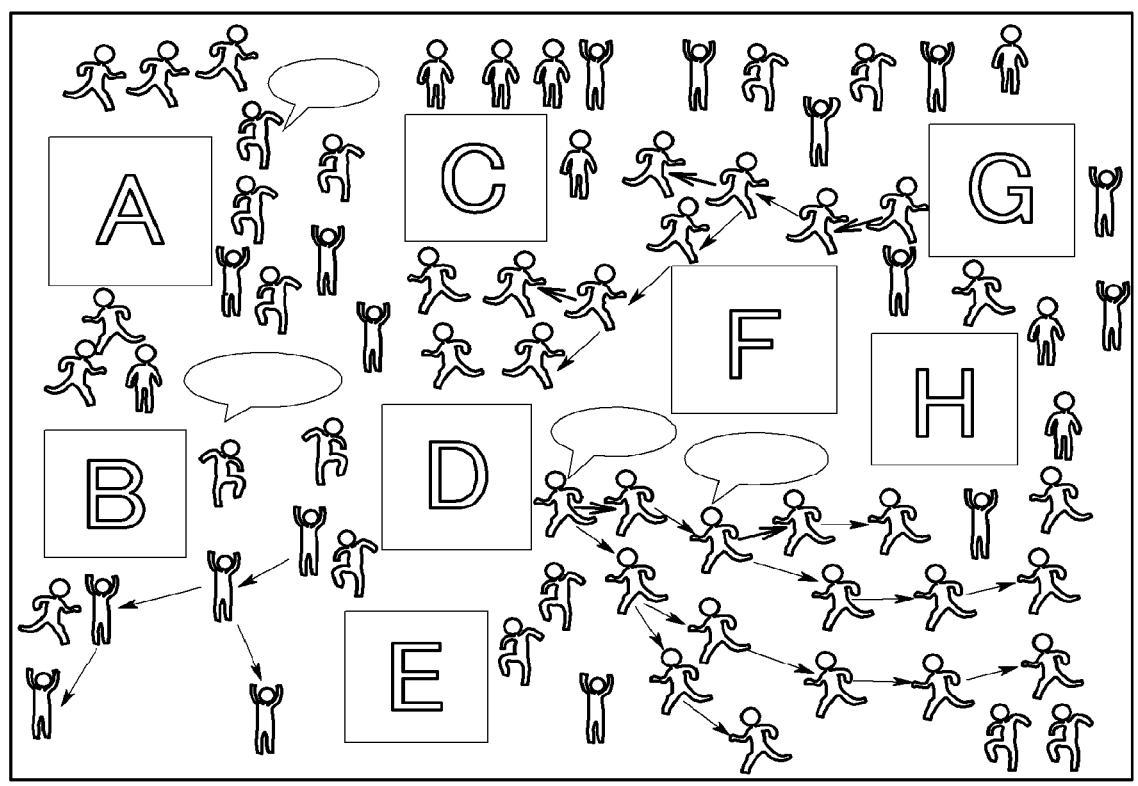
FIG. 8 A diagram illustrating an example of a selection screen for selecting a game and reproduction data item at the same time.

The reproduction data management unit 35 may generate a selection screen in which a game and a reproduction data item can be selected at the same time. FIG. 8 is an example of such a selection screen. In FIG. 8, square icons represent a plurality of games, and human-shaped icons associated with the square icons represent reproduction data items. When generating such a selection screen, icons may be placed such that the icons having tree structures similar to each other are placed closer to each other. In FIG. 8, a human-shaped icon that is not associated with a game represents a user who has not stored a reproduction data item. In such a case, for example, using information on games executed by the user in the past or owned by the user, the reproduction data management unit 35 specifies a game recommendable for the user from among the games to be executed by the game system 1. The reproduction data management unit 35 then places an icon representing the user at a position close to the recommendable game. This way enables the user who has not executed a game using a reproduction data item to easily find a game suitable to their taste. Balloons in FIG. 8 show tag information including comments provided by the users who have stored or played reproduction data items. The information thus displayed allows the user to more easily find the reproduction data items.

In the example of FIG. 8, human-shaped icons do not necessarily correspond to reproduction data items respectively, but an icon may represent a plurality of reproduction data items. In this case, based on the predetermined conditions, reproduction data items that appear to have relatively high similarities are combined together to represent an icon. Once this icon is selected, the plurality of reproduction data items represented by the icon are displayed on the selection screen, and the user can thus select respective reproduction data items.

In the above, the game server 20 and the game device 10 share processing, but at least a portion of the processing to be executed by the game server 20 as described above may be executed in the game device 10. For example, the game server 20 may be dedicated to manage the reproduction data items, and the game device 10 may execute game applications. In this case, the game device 10 transmits, to the game server 20, the reproduction data item generated in accordance with the instruction of the user so that the game server 20 stores the reproduction data item. In a case where the user selects one of the reproduction data items using the selection screen provided by the game server 20, the game device 10 downloads the selected reproduction data item from the game server 20 and starts execution of the game processing. Alternatively, the game device 10 may locally execute all the processing, such as storing a reproduction data item, generating management information MI, and generating a selection screen. In this case, there is no need to provide the game server 20. Further, the game device 10 does not necessarily have to make the plurality of users share the reproduction data items, but may generate a selection screen for presenting to one user a plurality of reproduction data items, which are stored by the user, by associating the reproduction data items together according to their parent-child relationship, and display the generated selection screen on the display device 15.

In the foregoing description, a reproduction data item is a snapshot data item including a memory image, but may be, as mentioned above, game specific saved data. In this case, for example, the game application itself may generate management information that associates a parent saved data item with a child saved data item, and based on the generated information, during the execution of the game, generate and present to the user a reproduction data selection screen that associates a parent saved data item with a child saved data item. In another case, the saved data items are managed by a system process that is different from the game application, and the game application requests the system process to provide a list of saved data items of the game. In this case, the game application presents to the user, as options, saved data items included in the list provided by the system process upon request. As such, the game application itself has no function to manage parent saved data items in association with child saved data items. In this case, the system process may manage parent saved data items in association with child saved data items, and in response to a request from the user, generate and present, to the user, a reproduction data selection screen that associates parent saved data items and child saved data items. In this example, the system process stores information for specifying the saved data item selected by the user while the reproduction data selection screen is presented to the user. Upon receiving a request from the game application for a list of saved data items, the system process provides the game application with the list including only the saved data items selected by that user. In this way, even if the game application has no function to manage the parent-child relationship of the saved data items, it is possible to present to the user the reproduction data selection screen that indicates the parent-child relationship of the saved data items, and allow the user to select the saved data item therefrom.

The invention claimed is:

1. A game server that executes game processing, comprising:
   a microprocessor operating under the control of a computer program, the computer program being stored on a non-transitory, computer readable storage medium, and the computer program, when executed by the microprocessor, causes the microprocessor to generate a selection screen that presents a plurality of reproduction data items, each for reproducing a state of a respective point in time during execution of a game and allowing a user of a game device to select one of the reproduction data items, each reproduction data item representing a respective state of the game achieved by the user while engaged in game play on the game device, the selection screen presenting a first reproduction data item, which is one of the plurality of reproduction data items, in association with a second reproduction data item, wherein the selection screen provides an indication to the user of whether the second reproduction data item reproduces a state of a point in time at which the game has progressed with reference to the state reproduced by the first reproduction data item,
   wherein the game server transmits the generated selection screen to the game device over a network such that the game device may display the received selection screen on a display device.

2. The game server according to claim 1, wherein the game server comprises:
   a section that stores information that identifies, in a case where the game server receives operation information indicative of an instruction to select one of the plurality of reproduction data items from the game device while the selection screen is displayed on the display device, the selected reproduction data item;

a section that executes, in a case where the game server receives operation information indicative of an instruction to select one of the plurality of reproduction data items from the game device, game processing from a state reproduced by the selected reproduction data item;

a section that stores, in a case where the game server receives operation information indicative of an instruction to store a reproduction data item from the game device during the execution of the game, a reproduction data item for reproducing a state of a point of time when the instruction is received;

a section that stores management information that associates the first reproduction data item with the second reproduction data item, the second reproduction data item being the reproduction data item stored in response to the instruction to store, and the first reproduction data item being the selected reproduction data item identified by the stored information; and a section that generates, using the management information, a selection screen that associates the first reproduction data item with the second reproduction data item.

3. The game server according to claim 1, wherein the selection screen is a screen that presents each of the plurality of reproduction data items in association with information on a user who has stored the reproduction data item.

4. The game server according to claim 1, wherein the selection screen represents a relationship between the first reproduction data item and the second reproduction data item in a tree structure.

5. The game server according to claim 1, wherein the association of the first reproduction data item and the second reproduction data item includes:
   (i) that the first reproduction data item represents a first state of the game achieved by the user while engaged in game play,
   (ii) that the second reproduction data item represents a second state of the game achieved by the user while engaged in game play,
   (iii) that the user selected the first reproduction data item from the selection screen to reproduce the first state of the game in order to engage in game play starting from the first state of the game, and
   (iv) that after selecting the first reproduction data and during such gameplay, the user achieves game play at the second state of the game and causes the second reproduction data item to be stored.

6. The game server according to claim 1, wherein the selection screen provides an indication to the user of a relationship between the first reproduction data item and the second reproduction data item via an arrow extending from the first reproduction data item and the second reproduction data item.

7. The game server according to claim 6, wherein the relationship of the first reproduction data item and the second reproduction data item includes:
   (i) that the first reproduction data item represents a first state of the game achieved by the user while engaged in game play,
   (ii) that the second reproduction data item represents a second state of the game achieved by the user while engaged in game play,
   (iii) that the user selected the first reproduction data item from the selection screen to reproduce the first state of the game in order to engage in game play starting from the first state of the game, and
   (iv) that after selecting the first reproduction data and during such gameplay, the user achieves game play at the second state of the game and causes the second reproduction data item to be stored.

8. A method for controlling a game server, comprising:

generating a selection screen that presents a plurality of reproduction data items, each for reproducing a state of a respective point in time during execution of a game and allowing a user of a game device to select one of the reproduction data items, each reproduction data item representing a respective state of the game achieved by the user while engaged in game play on the game device, the selection screen presenting a first reproduction data item, which is one of the plurality of reproduction data items, in association with a second reproduction data item, wherein the selection screen provides an indication to the user of whether the second reproduction data item reproduces a state of a point in time at which the game has progressed with reference to the state reproduced by the first reproduction data item; and transmitting the generated selection screen to the game device over a network such that the game device may display the received selection screen on a display device.

9. The method according to claim 8, wherein the control of the game server further comprises:

storing information that identifies, in a case where the game server receives operation information indicative of an instruction to select one of the plurality of reproduction data items from the game device while the selection screen is displayed on the display device, the selected reproduction data item;

executing, in a case where the game server receives operation information indicative of an instruction to select one of the plurality of reproduction data items from the game device, game processing from a state reproduced by the selected reproduction data item;

storing, in a case where the game server receives operation information indicative of an instruction to store a reproduction data item from the game device during the execution of the game, a reproduction data item for reproducing a state of a point of time when the instruction is received;

storing management information that associates the first reproduction data item with the second reproduction data item, the second reproduction data item being the reproduction data item stored in response to the instruction to store, and the first reproduction data item being the selected reproduction data item identified by the stored information; and generating, using the management information, a selection screen that associates the first reproduction data item with the second reproduction data item.

10. The method according to claim 8, wherein the selection screen is a screen that presents each of the plurality of reproduction data items in association with information on a user who has stored the reproduction data item.

11. The method according to claim 8, wherein the selection screen represents a relationship between the first reproduction data item and the second reproduction data item in a tree structure.

12. The method according to claim 8, wherein the association of the first reproduction data item and the second reproduction data item includes:

(i) that the first reproduction data item represents a first state of the game achieved by the user while engaged in game play, (ii) that the second reproduction data item represents a second state of the game achieved by the user while engaged in game play, (iii) that the user selected the first reproduction data item from the selection screen to reproduce the first state of the game in order to engage in game play starting from the first state of the game, and (iv) that after selecting the first reproduction data and during such gameplay, the user achieves game play at the second state of the game and causes the second reproduction data item to be stored.

13. The method according to claim 8, wherein the selection screen provides an indication to the user of a relationship between the first reproduction data item and the second reproduction data item via an arrow extending from the first reproduction data item and the second reproduction data item.

14. The method according to claim 13, wherein the relationship of the first reproduction data item and the second reproduction data item includes:

(i) that the first reproduction data item represents a first state of the game achieved by the user while engaged in game play, (ii) that the second reproduction data item represents a second state of the game achieved by the user while engaged in game play, (iii) that the user selected the first reproduction data item from the selection screen to reproduce the first state of the game in order to engage in game play starting from the first state of the game, and (iv) that after selecting the first reproduction data and during such gameplay, the user achieves game play at the second state of the game and causes the second reproduction data item to be stored.

15. A non-transitory, computer-readable information storage medium that stores a program for causing a computer operating as a game server to carry out actions, comprising:

generating a selection screen that presents a plurality of reproduction data items, each for reproducing a state of a respective point in time during execution of a game and allowing a user of a game device to select one of the reproduction data items, each reproduction data item representing a respective state of the game achieved by the user while engaged in game play on the game device, the selection screen presenting a first reproduction data item, which is one of the plurality of reproduction data items, in association with a second reproduction data item, wherein the selection screen provides an indication to the user of whether the second reproduction data item reproduces a state of a point in time at which the game has progressed with reference to the state reproduced by the first reproduction data item; and transmitting the generated selection screen to the game device over a network such that the game device may display the received selection screen on a display device.

16. The non-transitory, computer-readable information storage medium according to claim 15, wherein the computer operating as the game server carries out actions, further comprising:

storing information that identifies, in a case where the game server receives operation information indicative of an instruction to select one of the plurality of reproduction data items from the game device while the selection screen is displayed on the display device, the selected reproduction data item;

executing, in a case where the game server receives operation information indicative of an instruction to select one of the plurality of reproduction data items from the game device, game processing from a state reproduced by the selected reproduction data item;

storing, in a case where the game server receives operation information indicative of an instruction to store a reproduction data item from the game device during the execution of the game, a reproduction data item for reproducing a state of a point of time when the instruction is received;

storing management information that associates the first reproduction data item with the second reproduction data item, the second reproduction data item being the reproduction data item stored in response to the instruction to store, and the first reproduction data item being the selected reproduction data item identified by the stored information; and generating, using the management information, a selection screen that associates the first reproduction data item with the second reproduction data item.

17. The non-transitory, computer-readable information storage medium according to claim 15, wherein at least one of:

the selection screen is a screen that presents each of the plurality of reproduction data items in association with information on a user who has stored the reproduction data item; and the selection screen represents a relationship between the first reproduction data item and the second reproduction data item in a tree structure.

18. The non-transitory, computer-readable information storage medium according to claim 15, wherein the association of the first reproduction data item and the second reproduction data item includes:

(i) that the first reproduction data item represents a first state of the game achieved by the user while engaged in game play, (ii) that the second reproduction data item represents a second state of the game achieved by the user while engaged in game play, (iii) that the user selected the first reproduction data item from the selection screen to reproduce the first state of the game in order to engage in game play starting from the first state of the game, and (iv) that after selecting the first reproduction data and during such gameplay, the user achieves game play at the second state of the game and causes the second reproduction data item to be stored.

19. The non-transitory, computer-readable information storage medium according to claim 15, wherein the selection screen provides an indication to the user of a relationship between the first reproduction data item and the second reproduction data item via an arrow extending from the first reproduction data item and the second reproduction data item.

20. The non-transitory, computer-readable information storage medium according to claim 19, wherein the relationship of the first reproduction data item and the second reproduction data item includes:

(i) that the first reproduction data item represents a first state of the game achieved by the user while engaged in game play, (ii) that the second reproduction data item represents a second state of the game achieved by the user while engaged in game play,
(iii) that the user selected the first reproduction data item from the selection screen to reproduce the first state of the game in order to engage in game play starting from the first state of the game, and
(iv) that after selecting the first reproduction data and during such gameplay, the user achieves game play at the second state of the game and causes the second reproduction data item to be stored.

\* \* \* \* \*